Jan. 21, 1930.  K. KONDO  1,744,642
MANUFACTURE OF REPRODUCED DIFFRACTION GRATINGS
Filed July 19, 1926

A 2
1

A'
B

Ruled side
Film side 2
1

Inventor:
K. Kondo
by
Langner, Parry, Card + Langner
Attys.

Patented Jan. 21, 1930

1,744,642

UNITED STATES PATENT OFFICE

KENYU KONDO, OF KYOTO, JAPAN

MANUFACTURE OF REPRODUCED DIFFRACTION GRATINGS

Application filed July 19, 1926, Serial No. 123,503, and in Japan August 4, 1925.

This invention relates to a new method in the manufacture of reproduced diffraction gratings, and has for its object to obtain a grating with substantially the same effect of diffraction as a grating hitherto known, by a comparatively easy, quick and cheap method.

A diffraction grating hitherto known is made by ruling a great number of equidistant parallel lines on an optically polished surface of a glass or metallic plate. It requires a very delicate machine and skillful handling thereof for the manufacture of a grating, so that the price of a grating is too high to provide for ordinary use. A replica, which is made by means of casting and is pasted on a glass, is used as the substitute therefor for some purposes. Since a replica also requires considerable skillfulness in its manufacture, a prism is still widely used in spite of its inferiority to a grating for some purposes of spectroscopy.

According to my invention, a plane or concave reflecting grating can be obtained very easily. The method of my invention, in broad aspect, consists of the preparation of a dry plate and subsequent steps of its exposing, developing, silvering and washing. The details of this invention are described hereinafter, reference being had to the accompanying drawings, which are shown on a magnified scale.

In carrying out my invention, a dry plate is at first prepared. The film of the dry plate is made of bichromated gelatine, that is a mixture of gelatine and potassium bichromate. One gram of gelatine is put into about 60 cc. of water and is heated till the gelatine fully dissolves. About 0.3 gram of potassium bichromate is then added to the solution and homogeneously mixed therewith. The mixture thus prepared is filtered, and the filtrate is applied on a glass plate 1 so as to make a thin film 2, which is dried in a dark room. The dryness of the film should be sufficient. It is almost the best condition to be left one night at least, but the film must not be left too long from the time of preparation of same to its exposure, otherwise the silvering in the subsequent step would not be sufficient. The proportion of the agents above mentioned is a typical one, but this invention is not limited in this particular.

An original grating A is put on a dry plate obtained in this way in such a manner that the ruled surface of the grating is kept closely in contact to the film side of the dry plate, and exposed to the sun beam or artificial light. The time of exposure is of course to be regulated according to the kind of, and the distance from, the light source. On the whole, the exposure for a few minutes to the direct beam of the sun is sufficient. When the dry plate is sufficiently exposed, it is developed with water, either hot or cold. When the dry plate is kept in hot water for a few minutes, the parts of the film which were not affected by the light dissolve, and the other parts which were affected by the light remain undissolved. It is easily understood that the parts of the film on which the lines of the original faced are not exposed to the light, because the rays of the light which pass through the lines of the grating diffuse and the corresponding parts of the film are kept away from the effect of the light.

Figure 1:
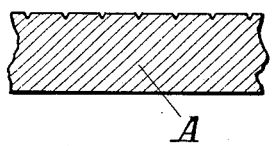
Fig. 1 is a sectional view of a grating taken transversely to the lines of the grating, which has been manufactured by ruling the lines on a glass plate.
Figure 5:
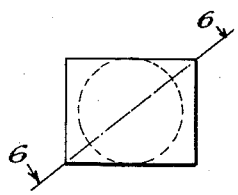
Fig. 5 is a plan view of the arrangement of a plane original grating in position over a concave plate, the circle $c$ representing one of the concentric lines where the thickness of the enclosed air spacing is of the same width.
Figure 2:
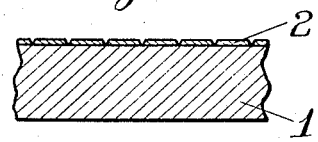
Fig. 2 is a sectional view of a glass plate coated with a film of bichromated gelatine, exposed to light through the original grating shown in Figure 1 and then washed with water.

When the dry plate has been developed, its sectional view becomes as shown in Fig. 2. The film side of this plate is then silvered by means of a proper method, for example, a reducing agent is applied to so-called silvering solution made of silver nitrate, caustic potash and ammonia. The condition of the surface coated with silver is substantially the same as that of one before the silvering, that is, a number of parallel lines or grooves as many as those of the original grating are formed on the surface, and the rays of light incidenced to the grooves are diffused and spectra appear due to the diffraction of the light reflected from the plane surface between the grooves.

Figure 3:
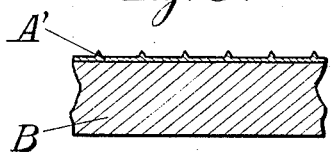
Fig. 3 is a sectional view of a replica, which was made by casting and the film portion of which is shown in adherence to a glass plate.
Figure 6:
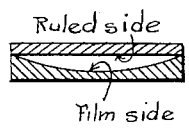
Fig. 6 is a section taken along the line 6—6 of Fig. 5.
Figure 4:
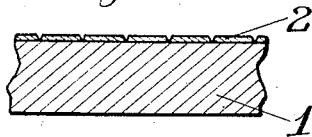
Fig. 4 is a sectional view of a glass plate as Fig. 2, but the original of it is that which is shown in Fig. 3.
Figure 7:
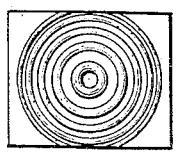
Fig. 7 is a plan view of the concave diffraction grating shown in Fig. 6, after its manufacture, the concentric shaded portions representing the so-called "blind fringes", referred to in the specification.

The similar grating can be reproduced in the same way as above described with an original grating A', shown in Fig. 3, the lines of which have been reproduced by a method of cast and pasting on the glass plate B.

By silvering on a reproduced grating made in accordance to my method, I can obtain a reflecting grating, which has largely intensified spectra and fine definition upon the spectrum; it is easy to obtain a reproduced grating superior to the original one.

In this way, original gratings containing 3,000 or 15,000 lines to the inch can be reproduced. When the closer one is reproduced there always appears a blind fringe or fringes—if one may use the term—upon the surface of the grating which vary with the order of the spectra, due to the defect that the contact of the film to the grating was not sufficiently close for all parts of the surface. However, an excellent one which has a higher and uniform intensity with no blind fringes can be obtained if an optically worked glass is adopted and coating of the film of bichromated gelatine is made carefully. The contact must be made as closely as possible, and the closer the contact the finer the grating.

Although the above description was done chiefly referring to the manufacture of the plane reflecting gratings, this method is not only adaptable for the manufacture of plane gratings, but for the manufacture of concave gratings with good results, by reproducing an original plane grating on a concave surface. I have obtained good results in the manufacture of concave gratings using a replica, which had 15000 lines to the inch, as an original. In the manufacture of concave gratings, much more attention is required than in the manufacture of plane ones.

A concave glass lens is prepared as for the plate of a dry plate, and the same is coated with the film of bichromated gelatine in the same manner as in the case of plane ones. The original is put on the concave dry plate so as the grating faces to the film side of the plate. In the exposure in this case, attention is directed to the presence of air in the lenticular space, or an air film the thickness of which varies between a concave surface of the dry plate and the plane original grating. For the exposure, a heliostat or an artificial parallel beam of the light should be used and the rays of light should be normally incidenced upon the surface of the grating, otherwise only the four corners of the grating would be reproduced and the central parts where air film is thick would not be sufficiently reproduced.

On developing the dry plate, there appear the spectra on the concave surface though the intensity of the spectra is faint. By silvering on the surface of the concave grating as is done to reproduce the plane gratings, I can obtain concave gratings with beautiful spectra. As a dry plate, when it is exposed to light, can not be kept closely in contact with an original grating all over the surface, blind fringes in regular concentric circles taking the center of the grating as their common centre and showing very faint spectra, appear on the grating reproduced. It is a very interesting phenomenon that such concentric blind circles appear on a concave grating in the spectra of odd order only, and the spectra of even order appear in uniform intensity over the whole surface of the grating. In the manufacture of a concave grating, there is an air space between a dry plate and original grating, so that a reproduced concave grating has, without exception, a number of blind rings. These rings are in the form of regular concentric circles while the blind fringe or fringes which sometimes appear on the plane grating are irregular. The number of the concentric blind circles depends on the curvature of the concave surface of the dry plate, the greater the curvature of the dry plate, the greater the number of the circles (e. g. about 30 rings for the one with the focal length 170 cm.).

In this way I can obtain concave gratings of any focal length by preparing concave surfaces of the required curvatures for dry plates.

The resolving power of these concave gratings is quite sufficient. I photographed the second order spectrum in the region of green of iron-arc with my concave grating of a size, half an inch by one inch, containing 15000 lines to the inch, with radius of curvature of 170 cm. From this I found that it could resolve up to the wave-length-difference of 0.3 Ångström. If the concave surface of the dry plate has a uniform curvature and the silvering is performed uniformly, the images of the special lines are very sharp.

The spectra of these gratings consist of the rays reflected from the silver surface. The failure of silver to reflect well the light in the ultra-violet region places a limit to the extent of the spectrum. As is well known, in the region of wave-length 3160 Å silver reflects only 4 percent of the incident light; in other words, it is inconvenient to use these gratings for the investigation of the spectrum of these regions. This inconvenience can be easily avoided by depositing nickel on the silver surface. In order to deposit nickel on the silver surface, I employ a dilute solution of double sulphate of nickel and ammonia as an electrolyte, into which a grating, made in accordance to this process, and a disk of sheet copper as large as the grating, are hung being kept about 4 centimeters apart, and electric current from a storage battery of about 3 volts is applied through them, the copper disk being connected to the anode of a battery. A beautiful deposition can be thrown down, though distinctly duller than the silver, in a few minutes. The silver substratum should have such a thickness that it shows a deep brown color when it is examined by a strong light, for if the substratum is too thin, the nickel can not be deposited uniformly.

The concave grating with nickel being deposited thereon, becomes useful to the investigation of ultra-violet region, too. I photographed with this concave grating of a size, half an inch by one inch, containing 15000 lines to the inch, with its second order spectrum, the ultra-violet region of spectrum of iron-arc. It showed that it can resolve 3100 Å of iron-arc into three distinctly, each wave-length difference being 0.36 Å. From the above description regarding the resolving power of the concave gratings, it is out of question that the plane grating in my invention has a greater resolving power, so that no further explanation is required.

What I claim is:—

1. A method of making reflecting diffration gratings comprising placing an original grating in contact with a dry plate coated with a film of bichromated gelatine, exposing the same to light in order to reproduce the lines of the original grating upon the dry plate developing the exposed dry plate by water, silvering the surface of the grating reproduced and in depositing nickel on the silvered surface.

2. A method of making reflecting diffraction gratings comprising placing an original grating in contact with a dry plate coated with a film of bichromated gelatine, exposing the same to light in order to reproduce the lines of the original grating upon the dry plate, developing the exposed plate and silvering the surface thereof by means of a reducing agent.

3. A method of making reflecting concave diffraction gratings comprising placing an original plane diffraction grating in front of a concave depression in a plate having the inner surface coated with a light sensitive substance differentially dissoluble when developed according to the degree of the intensity of the exposure to light in its several parts, passing a parallel beam of light through said plane grating in a direction normal to the plane thereof at all points of exposure, in order to reproduce the lines of the plane grating upon the concave plate, developing the concave plate, and providing the surface of the grating thus reproduced on the concave plate with a reflecting coating.

4. A method of making reflecting diffraction gratings comprising placing an original grating in contact with a plate coated with a film of light-sensitive substance differentially soluble according to the degree of intensity of its exposure to light in its various parts, exposing the same in order to reproduce the lines of the original grating upon the dry plate, developing the exposed plate, silvering the surface thereof, and depositing nickel upon the silvered surface.

In testimony whereof I have signed my name to this specification.

KENYU KONDO.